Figure 1:
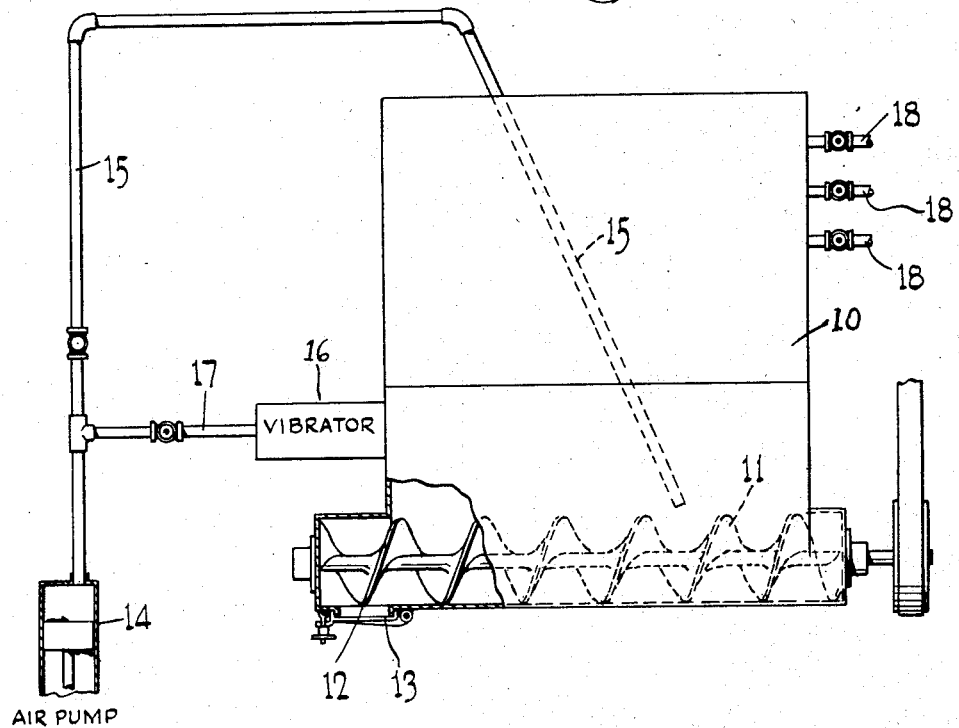

July 11, 1944.  F. TROTTER  2,353,602

METHOD AND APPARATUS FOR DEWATERING MINERAL CONCENTRATES

Filed March 26, 1941

INVENTOR
FRANK TROTTER
BY
*Hammond & Littell*
ATTORNEYS

Patented July 11, 1944

2,353,602

UNITED STATES PATENT OFFICE 2,353,602

METHOD AND APPARATUS FOR DEWATERING MINERAL CONCENTRATES

Frank Trotter, Cristo, Cuba, assignor to Cuban-American Manganese Corporation, New York, N. Y., a corporation of Delaware Application March 26, 1941, Serial No. 385,259

8 Claims. (Cl. 210—55)

This invention relates to processes for dewatering mineral concentrates, and to an apparatus in which said processes may be carried out.

The most common method of dewatering concentrates composed of particles of 28 microns, and smaller sizes, now being used in mineral recovery involves, firstly, dewatering as far as possible by subjecting the same to settling or thickening in suitable tanks and, secondly, filtering the thickened mass through a porous medium such as finely woven cloth or other porous substance contained in any one of a number of conventional mechanical filter devices. This treatment has been found incomplete in the treatment of some concentrates due to the adhesion and retention of part of the water within the mass, although the mass after the dewatering operation appears to be quite dry. The occluded water adhering to the concentrates is disadvantageous not only with respect to the subsequent recovery treatment given the same, but also with respect to freight costs which are unnecessarily high, and to leakage from the cars during transportation due to the water present.

The object of the present invention is to provide methods of dewatering concentrates which not only are quicker and cheaper to operate than commercial prior processes but which also remove a greater proportion of water. The reduction in water content means lower freight costs and avoidance of leakage from cars used in transportation. A further object is to provide an apparatus in which the process may be carried out with the minimum of handling, at a low cost, and in a short period of time.

In accordance with the preferred embodiment, the process of the present invention involves subjecting the concentrates to the action of a stream, or streams, of compressed air for a period of a few minutes whereby the occluded water adhering to the particles is caused to coalesce and to become separable therefrom, after which it will be found that the liberated water will readily rise to the surface in a short while. The water which rises to the top of the mass may then be readily drawn off by decanting, siphoning, or through the action of pumps. The effectiveness of the compressed air is believed primarily due to a rapid vibration and agitation of the mass on the particles therein. The principal action of the air in causing the movement is the formation of myriads of air bubbles which are forced up through the mass by other bubbles constantly being formed.

In accordance with another embodiment of the invention, the mass of concentrates contained in a tank is vibrated by means of a mechanical vibrator of any suitable construction acting directly on the tank. In its broader aspects the invention comprehends the simultaneous or supplementary use of both types of vibrating means.

The process of the present invention may be readily understood by reference to the accompanying drawing in which there is diagrammatically illustrated an apparatus in which the process may be effectively carried out.

Figure 2:
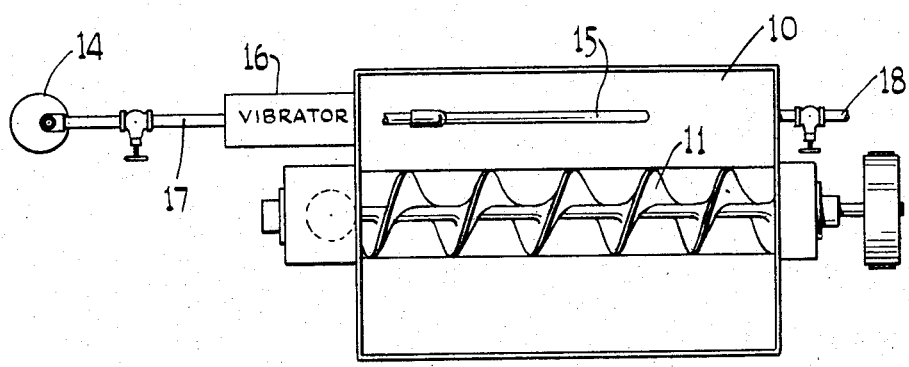

With reference to the drawing, Figure 1 is an elevation; and Figure 2 is a plan view.

In the apparatus illustrated there is shown a leak-proof tank or container 10 having an open top for the introduction of the concentrates to be dewatered. The tank is provided with a discharge mechanism composed of a screw conveyor 11 adapted to convey the treated concentrates to the discharge outlet 12 provided with a leak-proof closure 13. The tank 10 may be rectangular or of any other suitable shape, and the discharge mechanism should be of sufficient size, or duplicated by a sufficient number, to discharge the tank contents within a short period of time.

Included with the apparatus is an air pump 14 or other source of air pressure connected through a valved conduit 15 terminating within the tank 10, which conduit may or may not be permanently attached to the tank wall. The tank 10 may also have attached to a wall thereof a vibrator 16 connected to the air pump 14 through the valved connection 17. Near the top of the tank 10 there are three valved outlets 18 at different levels.

In carrying out the process of the present invention in the illustrated apparatus the outlet 12 and the valved outlets 18 are closed. Mineral concentrates which may or may not have already been partially dewatered or thickened are introduced into the open top of the tank 10 to a level preferably above the highest outlet 18. Then the pipe or conduit 15, if not already in position, is pushed within the mass of concentrates substantially to the bottom of the tank. Thereupon a pulsating stream of compressed air generated in the air pump 14 is passed through the conduit 15 into the bottom of the concentrates. After a few minutes of agitation or vibration caused by the compressed air, the air is shut off. If the whole body of concentrates is not vibrated adequately, the air pipe 15 is shifted to other positions in the mass and the process repeated. Thereafter the mass is permitted to settle. When the water rises to the top it is decanted off through one or more of the valved oulets 18. Finally, the discharge outlet 12 is opened and the screw conveyor 11 is actuated to force out of the tank the dewatered concentrates which are in the form of a solid mass, i. e., a non-fluid or non-flowable mass.

Although a single treatment in this manner is usually sufficient, the operation may be repeated if additional water can thereby be released. The normal vibration of the mass by the direct introduction of compressed air may be assisted either by using a pulsating stream of air from a reciprocating compressor, or, by using the mechanical vibrator 16 which in operation causes the tank itself to vibrate as well as the concentrates. In the treatment of specific concentrates it may be found more effective to use the mechanical vibrator 16 alone, without using compressed air directly through the conduit 15. Generally, however, vibration generated by a stream of compressed air directly within the concentrates gives the most effective results, for through the use of the air in this manner a more thorough and quicker agitation is obtained at a lower cost. The vibration treatment in either case results in the formation of long tubular vertical channels in the concentrates through which the water rises to the top.

If a continuous dewatering operation is desired to take care of a steady supply of concentrates, a series of tanks may be provided, or a single tank divided into three or more compartments may be employed and the same operated such that one tank or compartment is being filled while a second one is being vibrated and a third is being discharged.

Examples

*Example 1.*—Manganese mineral having a particle size of 1000 microns down to 0.5 micron after being separated from its gangue by flotation is first settled in a large drag conveyor to remove the readily separable water. The thickened mineral containing about 30% moisture is then conveyed to the tank 10, whereupon the mass is subjected to a vibration treatment by means of compressed air under 90 pounds pressure for a period of about 3 minutes, the air being introduced through the conduit 15. The mass was then permitted to settle, and during such period vertical passages of about one-quarter of an inch in diameter formed, through which water could be seen emerging at the surface. The supernatant water was then decanted off, leaving a mass containing about 18% of water.

*Example 2.*—Manganese mineral separated from its gangue by flotation, was settled to remove a portion of the water, and vacuum filtered to remove an additional quantity of water. The resulting partially dewatered filter cake containing 25% of water was introduced into the tank 10 and subjected to vibration in the manner described in Example 1. Thereafter the mass was permitted to settle. The water which rose to the top was then decanted off. Finally, the mass was discharged from the tank and upon test was found to contain only 18% water.

*Example 3.*—A complex lead, gold, silver and copper concentrate separated from its gangue by flotation and thickened in a thickener tank, was further dewatered by means of a rotary continuous vacuum filter using a special woven canvas as a filtering medium. The concentrates discharged from the filter possessed an apparent dryness sufficient to permit a heavy man to walk thereon, leaving only a slight marking of moisture on the soles of his shoes. This concentrate was thereafter further dewatered in accordance with the present invention by mechanical vibration applied to the tank until the water would separate on standing. The concentrates become semi-fluid in character and any heavy object placed upon the surface of the concentrates would immediately sink to the bottom. After settling, the water which rose was drawn off and the dewatered concentrates were discharged.

Although the foregoing examples describe the application of the process of the instant invention to concentrates which have already been filtered to remove a major portion of the water, it should be understood that the process is applicable to concentrates which have not been previously dewatered by filtering or equivalent treatment.

The process and the apparatus of the present invention are particularly designed for the treatment of mineral concentrates, and are especially intended for the treatment of concentrates obtained by flotation, but the process and apparatus are suitable for the treatment of any mass of particles containing water held within the material in such manner as to resist the force of conventional commercial separating devices. Materials having particles of 1000 microns and smaller respond readily to the treatment.

It should be understood that the present invention is not limited to the specific steps or apparatus shown but extends to all equivalents which will occur to those skilled in the art upon consideration of the terms of the claims appended hereto.

I claim:

1. The process of removing occluded water from mineral concentrates which comprises subjecting a body of such concentrates to vibration until the occluded water will readily separate by settling, thereafter settling the mass until the water rises to the top and the mineral concentrates collect at the bottom in the form of a solid, non-flowable mass and drawing off said water.

2. The process of dewatering mineral concentrates which comprises removing adherent water by vibrating a mass of such concentrates until the adhesion is disrupted, and thereafter gravitationally separating the concentrates in a solid, non-flowable form from the supernatant water.

3. The process of removing occluded water from flotation concentrates which comprises introducing compressed air into said concentrates to cause vibration of the same whereby the adhesion between the occluded water and the concentrates is disrupted, and drawing off the water which separates from the concentrates.

4. The process of removing occluded water from flotation concentrates which comprises vibrating a mass of such concentrates by means of a stream of compressed air until vertical channels will form therein on settling, settling said mass and separating the water which rises to the surface.

5. The process of removing occluded water from mineral concentrates which comprises introducing a pulsating stream of compressed air into a mass of said concentrates until the occluded water will separate on standing, settling the mass whereby released water rises to the top, and separating the water.

6. The process of removing occluded water from a mass of flotation concentrates in a container which comprises vibrating said container and said mass until said occluded water will separate on settling thereafter, settling the mass, and finally separating the supernatant water.

7. The process of removing additional water from flotation concentrates from which all water removable by ordinary settling has already been separated which comprises vibrating a mass of such concentrates until vertical passages will form in said mass on standing and water commences to rise to the surface, thereafter settling the mass and removing the supernatant water.

8. An apparatus for dewatering flotation concentrates which comprises a tank, an opening therein for the introduction of concentrates, means for introducing a stream of compressed air near the bottom thereof, means for drawing off water near the top thereof, and means for discharging dried non-flowable concentrates therefrom.

FRANK TROTTER.